April 1, 1952     F. VAN DER PLAS     2,591,029
COIN-WATER METER
Filed Dec. 23, 1947     2 SHEETS—SHEET 1

*INVENTOR.*
Frederik Van Der Plas,
BY
C. F. Wenderoth
*Attorney*

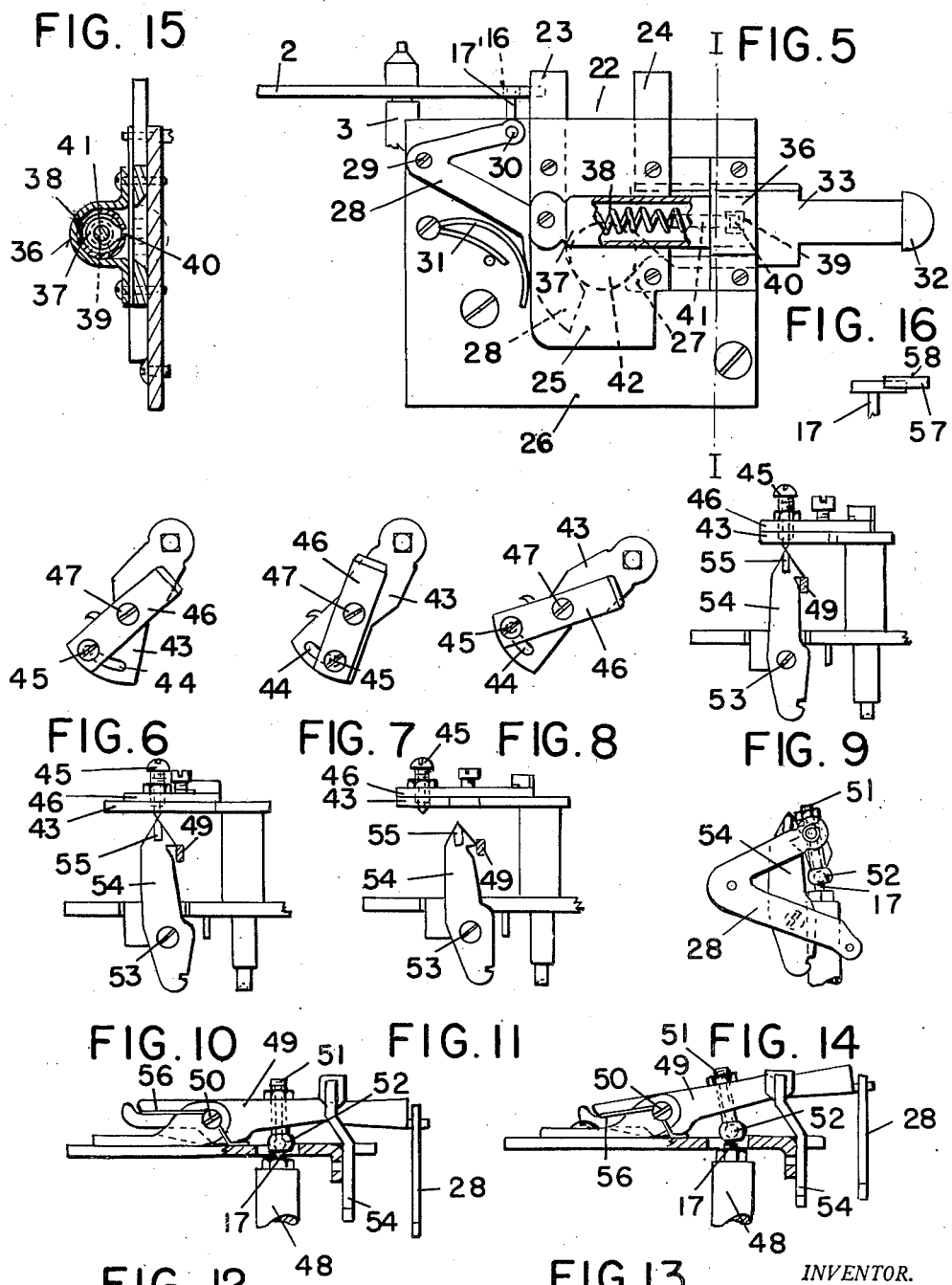

Patented Apr. 1, 1952

2,591,029

UNITED STATES PATENT OFFICE 2,591,029

COIN WATER METER

Frederik van der Plas, Bandoeng, Netherlands

Application December 23, 1947, Serial No. 793,363
In the Netherlands June 10, 1941

Section 1, Public Law 690, August 8, 1946
Patent expires June 10, 1961

6 Claims. (Cl. 222—2)

This application relates to similar apparatus to that disclosed in application Serial No. 307,509 filed December 4, 1939, now Patent No. 2,358,268 granted September 12, 1944.

The invention relates to an apparatus, which can be fixed to every watermeter, so that the whole can act as a coin watermeter, whereby at the same time the consumed quantity of water can directly be read from the watermeter.

A construction according to the invention consists in affixing a valve in the watermeter in the form of a membrane, which opens or closes the water supply, that is regulated by a bar or some similar arrangement that communicates with the liquid-meter by means of a revolving plate or similar device.

The invention is shown in the annexed drawings, whereupon for example and schematically, various forms are given.

Fig. 5 shows the coupling of the coin apparatus to the bar and the plate, according to the invention.

Figs. 6 to 14 show another form of revolving plate with the elements in different positions.

Fig. 15 shows a view along the line I—I of Fig. 5.

Fig. 16 is a modification which may be employed as a part coupling the bar to the plate according to the invention.

Figure 1:
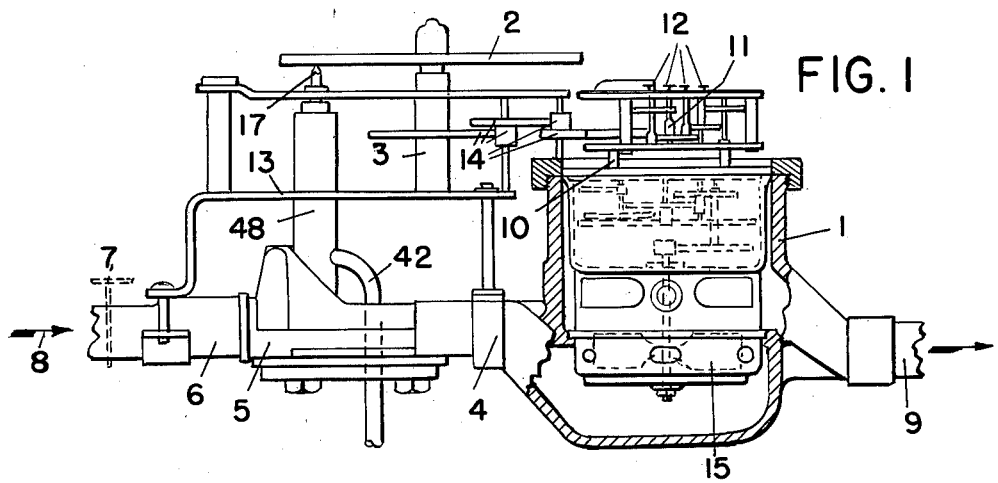
Fig. 1 shows partly a side view and partly a section of a coin-watermeter according to the invention.

On Fig. 1, 1 shows a normal watermeter, while 2 shows a device according to the invention. This consists of a flat plate 2 which is fastened to the vertical axle 3. A valve 5 is connected to the coupling piece 4, to which valve on the other side is brought an iron-pipe 6, with stop cock 7, schematically shown. The arrow 8 shows the water direction, coming from the main net through valve 5, and watermeter 1 and leaving the instrument at 9. Axle 10 extends outside through a packing-gland, such as is used in ordinary watermeters and through the cover-plate of the watermeter and drives through a transmission 11, the counting mechanism 12, above the watermeter.

Figure 2:
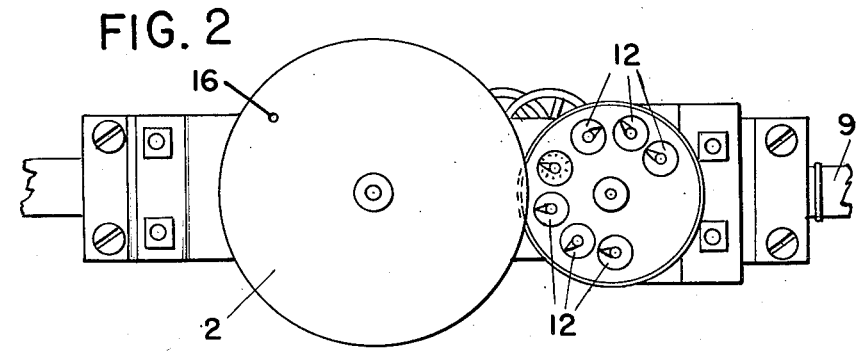
Fig. 2 shows a plan view of the apparatus according to Fig. 1.

On the coupling piece 4 and the iron tube 6, a bridge 13 is fastened. On this bridge, the axle 3 is joined to axle 10 through a transmission. As plate 2 is fixed to axle 3, this axle and also plate 2, will be rotated through the transmission of 10 and 14, when the wing of watermeter 15 assumes such a movement. In plate 2 a small opening 16 is made, see Fig. 2, allowing viewing of plate 2 and the counting-mechanism 12. This opening 16 corresponds with needle bar 17, which fits exactly in this opening. This needle 17 is connected to valve 5 which regulates the supply of water. When needle 17 shoots upwards into the hole 16 through the action of a spring 18 (see Fig. 3) the supply is shut off. If the needle 17 is again pressed down through the coin-control, then the water supply is opened; the flowing water brings the impeller 15, and also plate 2 into rotation, the opening 16 is displaced and needle 17 is thus pressed only against the plate 2, whether running in a groove or not. By this means the water supply remains open until opening 16 again appears above the needle 17, and when the needle 17 reenters opening 16 the water supply is shut off. The quantity of water supplied for a coin-piece is thus fixed to one revolution of plate 2. This quantity can be read from the watermeter. Conversely one revolution of the plate 2 can be adjusted to yield a certain quantity of water by the application of an adapted transmission. The valve 5 is a well-known device provided with a membrane, which does not need further discussion.

Figures 3, 4:
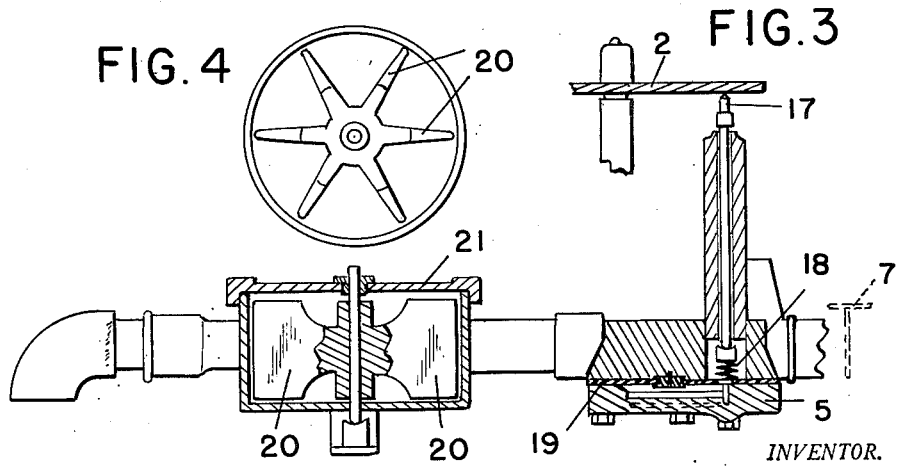
Fig. 3 shows the connection of the bar with the plate and the membrane in section, while in the conduit-pipe, a simple water wheel is affixed.
Fig. 4 shows a section of such a wheel.

Fig. 3 shows a section of a case 21, a water-impeller 20, valve 5 and needle 17 with plate 2 while Fig. 4 shows a top view of the impeller 20 in the case 21 with the cover removed. This is a simple watermeter designed for small water consumers. 19 is a membrane with which the water supply is opened or shut off.

Fig. 5 shows a coin apparatus. Fig. 5 is a side-view of the coin apparatus with a connection to plate 2 by means of needle 17. 22 is the channel formed by two ledges 23 and 24 and by front-plate 25 and back-plate 26 into which the coin is dropped. After dropping the coin in the apparatus, it falls downwardly in the channel and comes to rest on the ridge 27 and a pawl 28. This pawl is revolvable on the spindle 29 and is connected at its upper edge revolvably by a pin and hole connection 30 with the needle 17'. The lower edge of the pawl is bent in such a manner that the coin can be held. Through the spring 31 the pawl 28 is continually urged upwardly whereby the needle 17' remains against the plate 2. Fig. 5 shows the manner in which the coin 42 is inserted into the coin apparatus and how it rests on the ridge 27 and the pawl 28, whereby the water supply is shut off, because the needle 17' is pressed into the hole 16.

When now the button 32 is pressed, which is integral with a slide 33, the slide 33 pushes the coin against the pawl 28, with its left lower edge which is bevel-edged and the pawl gives way oscillating round the axle 29. When the space between the pawl 28 and the ridge 27 is wide enough, the coin drops down and falls in a coin-box. In this position the needle 17' is just drawn upwardly so far that the plate 2 is freed and the membrane 19 in valve 5 is opened, so that the water flows through the meter thus revolving also the wingwheel 15 and consequently plate 2. When button 32 is released, the plate 2 has revolved so far that needle 17' cannot again be pressed into hole 16 but remains pressed against the plate, leaving the membrane open so that the water continues to flow.

The construction of the slide together with the appertaining spring device that serves to press the button 32 back again, is shown in Fig. 15, which shows a section on section line I—I in Fig. 5. Strap 36 holds the tube 37, in which spring 38 is mounted. A lug 39 is secured to the slide 33 by means of a shaft 40. This shaft slides in a groove 41 provided in the tube 37 and the plate 25 forwardly and backwardly. When the button 32 is pushed to the left, the slide 33 moves and the shaft 41 slides in the groove. The spring 38 is stretched by lug 39. When the button 32 is released, then the spring 38 presses the lug, and with it the slide 33 and button 32 back again to its former position.

One advantage of the invention is, that it can be fixed to all common water supply nets, and each consumer at his request can receive a coinmeter instead of an ordinary meter. When this is the case an arrangement according to Fig. 1 must be applied. At the end 9 (see Fig. 1) the house water pipe is connected, so that valve 5 and watermeter 1 are under pressure as cock 7 remains open and the taps in the house are closed. When now a coin is dropped into the apparatus, then the eventual leaking water will remain flowing through the valve along needle 17. This water must be exhausted for which pipe 42 is used, see Fig. 1.

This water is much less than each ordinary water requires to start working. When we consider the fact that each water consumer has the opportunity to drain off a certain amount of water from under the wing by the usual well-known watermeter, by which the quantity is more than what passes the valve, then this leaky water does not play any important part, as this is only a trifling part of the water that is or can be usually consumed by the public by every watermeter. A second advantage is, that the quantity to be supplied is always the same, because there are no parts that can change the quantity. There is a pipe 6 (see Fig. 1) that supplies the water and a plate 2 that fixes the duration of the water supply. This is connected to a watermeter of a well-known sort, which is practically without defects by means of a motion 14, so that the faultless operating of the device according to the invention can be taken for granted, as was proved by experiments. The membrane closes accurately exactly on the liter. For this it is necessary that needle 17 and opening 16 be constructed without or with as little as possible clearance.

To summarize, the following applications are possible with this coin watermeter:

a. The coin-meter is used by the public with sealed opened switch and a bendpiece to be able to receive water in buckets (see Fig. 3). Through this application the instrument remains practically without pressure. After each coin-dropping the supply of water takes place without any interruption. For this it is not necessary to use too expensive and accurate watermeters, and the construction, that is given in this figure, is sufficient.

b. The switch 7 (see Fig. 1) is sometimes used to drain off as much as may be required, in that case it is not sealed and a construction with a good watermeter is necessary as shown in Fig. 1.

c. The coin-meter is affixed in the stead of the usual common watermeter. In that case a construction as given in Fig. 1 is necessary.

The invention does not confine itself to this construction. Many variations are possible, by which needle 17 is pushed back to its original position after a certain number of revolutions from the wingwheel of a watermeter or another wheel. Some examples may serve as illustration:

The horizontally revolving plate 2 can be replaced by a revolving in vertical position or by a vertical ring with a hole in it, corresponding with needle 17. Also the supply of water can be stopped by the removing of a revolving pawl which holds down needle 17. This removing may be brought into effect by a cam fixed to an axle or a tooth-wheel which after one revolution, knocks off the pawl over the needle. By the pressing of button 32 the pawl can again be readjusted, for instance through a spring work, after the needle has been pulled down, as is shown above (see Figs. 6 to 14). The round plate 2 with the opening can in this way replaced by an arm 43 (Fig. 6) with opening 44. Pin 45 is affixed to a jaw 46, movable round axle 47, by which the pin 45 in the opening 44 of arm 45 can move in either direction. Pin 45 cuts through the opening 44 so that this pin protrudes from the bottom of the arm. By fixing a weak spring between arm 43 and jaw 46, pin 45 is normally held in place in the opening 44 as is shown on Fig. 6.

The pin 17 in case 48 (see Figs. 12 and 13) does not press any more by open membrane, against the revolving plate 2 but is held in the downward position through an arm 49 revolvable round 50 (see Fig. 12) to which is fixed a spherically spindle 51, on which at the bottom a movable hood 52 also spherically is affixed, that presses on pin 17, so that each friction by the movement is eliminated, whilst the arm 49 is held in downward position through a pawl 54 revolvable round 53 (see Figs. 9, 10 and 11). The connection of the coin arrangement with the liquid arrangement the arm 28 (see Fig. 14) does not work directly on pin 17 but on arm 49. When thus simultaneously with the pressure of the coin the liquid automatic device is brought in use, the downward pressure of the arm 28 (see Fig. 14) will also press downward arm 49 revolvable round 50 together with pin 17, by means of 51 and 52, so that the membrane is opened (see Fig. 12) while the arm 49 is held in downward position by pawl 54 (see Fig. 9).

By means of a weak spring pawl 54 is pressed against arm 49. When the water flows, arm 43 will start turning until pin 45 reaches knife 55 of pawl 54 (see Fig. 9). By this revolving arm 43 does not meet with any resistance. By continued turning of arm 43, pin 45 will be pressed against the knife and remain there so that pin 45 passes through the opening 44 and that so long, until the opening 44 has entirely been passed through (see Fig. 7); at this moment pin 45 again will turn together with arm 43 and force aside knife 55 (see Fig. 10) till pin 45 has passed over the knife 55. Already before this has happened pawl 54 is pulled away from arm 49, so that 49 is pressed upward through 56 acting at the other end of 49 (see Fig. 11) thus releasing pin 17, that bounds upward and stops the water supply (see Fig. 13). Pin 45 is then again brought back to its normal position in opening 44 by the weak spring (see Fig. 8) so that by the bringing into action of the automatic device, pin 45 can never prevent the fastening of arm 49 when this is pulled downward, because groove 44 has been extended far enough to enable pin 45 to come to rest sufficiently far from arm 49. In this way little quantities of water can be drawn at all times, while arm 43 can turn with any degree of slowness because it does not experience any resistance. Only when the pin leans against the knife, a little resistance is experienced that will force pawl 54 from arm 49. This friction can be limited to a very small degree. When the coin-watermeter is used for coins, through which a great quantity of water can be drawn, plate 2 must revolve very slowly. It might happen in that case that, after the pressure of the coin on button 32, the plate has revolved so little that needle 17 still fits in opening 16. A second plate of smaller size to be fixed to the Liter's wheel or a part of it, is in this case necessary, beneath which is also placed a needle, which however must be joined to the original needle 17; this one will after the pressing of button 32, quickly thus far be displaced that through the rebounding of button 32 the second needle will be pressed under against the plate by which also the principal needle 17 is held in the position "press down" for holding open the valve.

Another variation of construction of the plate consists in affixing a spiral-groove under in the plate, in which fits a pen or some similar device. The groove runs spirally from the edge to the centre of the plate. When the plate revolves, the pen is drawn with it to the centre. This can happen for instance by fixing a simple slide 57 with pin 58 (see Fig. 16) to the vertical bar of pin 17 that can be moved to or from the centre of the plate in a radical direction, and that is drawn to its original position by a spring, as soon as pen 58 and together with it, the slide, is pressed or pulled downward out of the groove. The track of the slide is thus connected to pen 17. At certain distance from the centre of plate 2, pen 58 can bound into an opening existing there, through which the slide bounds together with the needle 17 upward thus stopping the water supply.

For coin watermeters from which per coin, a great quantity of water can be drawn, such a construction could be suitable. It is however recommendable to use coin watermeters only for the supplying of such quantities of water supply, which are dependent on only one revolution of plate 2.

Applicants construction preferably a membrane is used for the stopping of the liquid in the lead, while further more exclusively axle 17, which acts on it, is used for the coupling of plate 2 and the membrane. In this way the instrument has become so much simpler and safer in use than other known systems.

What I claim is:

1. A coin controlled water meter comprising a measuring device, a transmission actuated by said water meter, a membrane valve, a control valve for said membrane valve, a control rod for said control valve, a coin control for said rod, an arm, a pawl and a second arm operated by said transmission and controlling said rod by means of said first arm and said pawl.

2. A measuring device comprising a water meter, a first arm rotated by said water meter in proportion to the amount of water passing therethrough, said arm having a pin, a valve for controlling the water flow through said meter, an axially movable rod eccentrically of and parallel to the axis of rotation of said arm for opening and closing said valve, a second arm, means for normally urging one end of said rod into engagement with said second arm, a pawl holding said second arm in downward position, a pin on said first arm for pulling said pawl away from said second arm whereby said rod will bound upwardly, thereby closing said valve when said first arm has rotated through a predetermined angle, and means for withdrawing said rod from said upward position to initiate the operation of said device.

3. A measuring device comprising a water meter, a first arm rotated by said water meter in proportion to the amount of water passing through said meter, said arm having an opening, a pin movable in said opening, an axle, a jaw to which said pin is affixed movable round said axle alternatively, a weak spring between said arm and said jaw, a valve controlling the waterflow through said meter, an axially movable rod for opening and closing said valve, a second arm, means for normally urging one end of said rod into engagement with said second arm, a pawl, said second arm being held in downward position by said pawl, said pawl being pulled away from said second arm by said pin whereby said rod will bound upwardly, thereby closing said valve when said first arm has rotated through a predetermined angle, and means to withdraw said rod from said upward position to initiate the operation of said device.

4. A measuring device according to claim 2, in which said second arm is revolvable round an axle, a spherical spindle fixed to said second arm and a head at the bottom thereof movable in all directions pressing on said rod.

5. A measuring device according to claim 3 in which said second arm is revolvable round an axle to which arm is fixed a spherical spindle, on which at the bottom a head movable in all directions, is affixed also spherically, that presses on said rod.

6. A measuring device according to claim 1, in which the pawl revolvable round an axle is provided with a knife against which said pin will push.

FREDERIK VAN DER PLAS.

REFERENCES CITED

The following references are of record in the file of this patent:

UNITED STATES PATENTS

| Number | Name | Date |
|---|---|---|
| 1,866,523 | Alexander | July 12, 1932 |
| 1,977,606 | Benaiges | Oct. 23, 1934 |
| 2,358,268 | Van Der Plas | Sept. 12, 1944 |